United States Patent [19]
Eckhout

[11] Patent Number: 5,590,902
[45] Date of Patent: Jan. 7, 1997

[54] AIR BAG COVER HAVING A SWITCH ASSEMBLY DISPOSED THEREIN

[75] Inventor: Thomas L. Eckhout, Waterford, Mich.

[73] Assignee: Larry J. Winget, Leonard, Mich.

[21] Appl. No.: 407,925

[22] Filed: Mar. 21, 1995

Related U.S. Application Data

[63] Continuation-in-part of Ser. No. 140,669, Oct. 21, 1993, abandoned, and Ser. No. 248,556, May 24, 1994, abandoned, which is a continuation of Ser. No. 984,326, Dec. 2, 1992, abandoned.

[51] Int. Cl.[6] .................................................. B60R 21/20
[52] U.S. Cl. ...................... 280/728.3; 200/61.54
[58] Field of Search .............................. 280/731, 728.3, 280/728.1; 200/61.54, 61.55

[56] References Cited

U.S. PATENT DOCUMENTS

| | | | |
|---|---|---|---|
| 4,325,568 | 4/1982 | Clark et al. | 280/731 |
| 4,934,735 | 6/1990 | Embach | 280/731 |
| 5,062,661 | 11/1991 | Winget | 280/731 |
| 5,085,462 | 2/1992 | Gualtier | 280/731 |
| 5,186,490 | 2/1993 | Adams et al. | 280/731 |
| 5,265,904 | 11/1993 | Shelton et al. | 200/61.54 |
| 5,308,106 | 5/1994 | Heidorn | 280/728.3 |
| 5,338,059 | 8/1994 | Inoue et al. | 280/731 |
| 5,344,185 | 9/1994 | Cooke, II | 280/731 |
| 5,369,232 | 11/1994 | Leonelli | 280/731 |
| 5,371,333 | 12/1994 | Kanai et al. | 280/731 |
| 5,399,819 | 3/1995 | Lang et al. | 280/731 |
| 5,423,569 | 6/1995 | Reighard et al. | 280/731 |

FOREIGN PATENT DOCUMENTS

| | | | |
|---|---|---|---|
| 3-143752 | 6/1991 | Japan | 280/731 |
| 4-78744 | 3/1992 | Japan | 280/731 |

Primary Examiner—Robert J. Oberleitner
Assistant Examiner—Peter C. English
Attorney, Agent, or Firm—Brooks & Kushman P.C.

[57] ABSTRACT

A snap-on air bag cover for use with an air bag container having a retaining member. The snap-on air bag cover includes a plastic front cover adapted to directly enclose an uninflated air bag. A pair of plastic side panels are connected to opposite sides of the front cover. A resilient clip member extends from each of the side panels, the clip member having an extending snap-on groove defined therein adapted to cooperate with the retaining member for affixing the air bag cover to the air bag container. The pair of side panels are connected to the front cover such that the side panels and resilient clip members are permitted to pivotably travel away from each other in opposite directions allowing the retaining member to enter and abuttingly engage the snap-on groove thereby retaining the air bag cover on the air bag container. A horn switch assembly is disposed in and substantially fills at least one compartment formed at the inner surface of the cover. The switch assembly is slidably and removably secured in a compartment formed by a rear panel which is secured to the inner surface of the cover at upper and lower flanges. One or both of the side panels have slots formed therein so that the switch assembly can be removed from the cover for servicing.

15 Claims, 3 Drawing Sheets

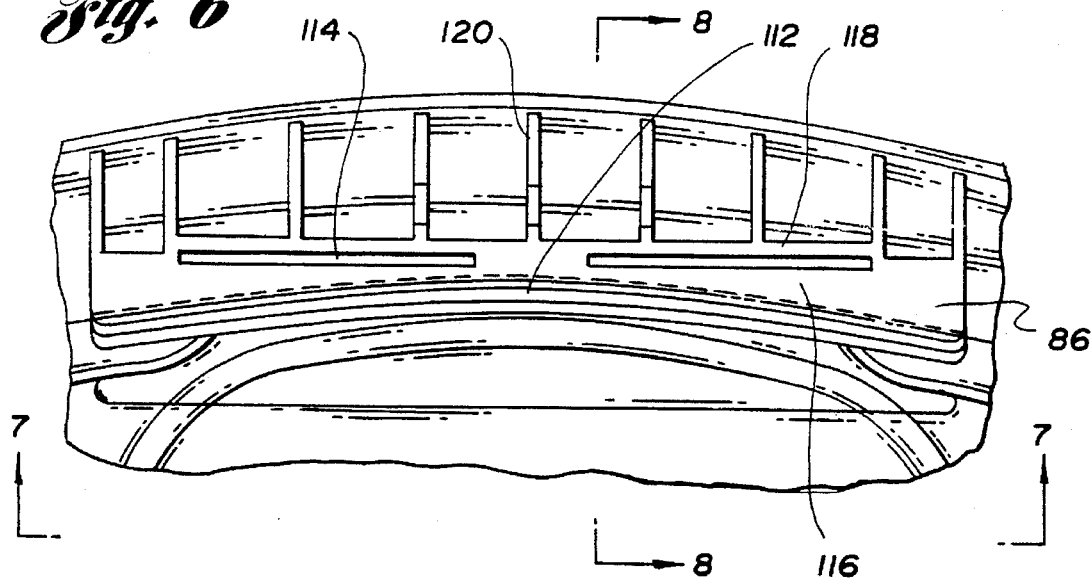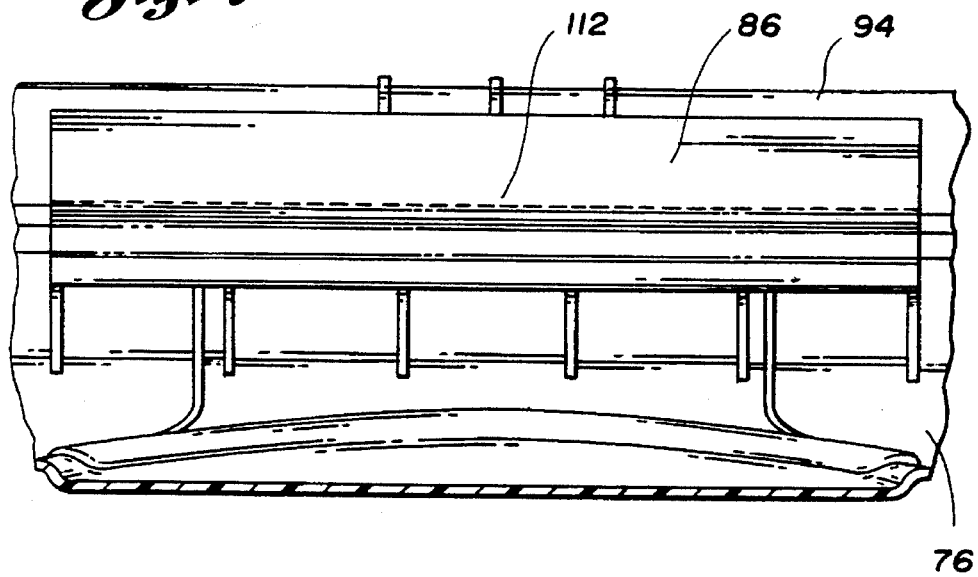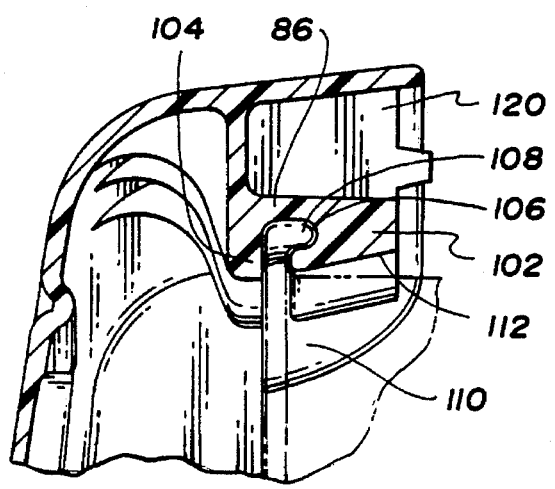

AIR BAG COVER HAVING A SWITCH ASSEMBLY DISPOSED THEREIN

CROSS-REFERENCE TO RELATED APPLICATIONS

This is a continuation-in-part application of U.S. patent application Ser. No. 08/140,669, filed Oct. 21, 1993, abandoned, and Ser. No. 08/248,556, filed May 24, 1994, abandoned, which, in turn, is a continuation application of U.S. patent application Ser. No. 07/984,326, filed Dec. 2, 1992, abandoned.

TECHNICAL FIELD

This invention relates to plastic air bag covers having switch assemblies therein and, in particular, to such covers which are affixable to air bag containers.

BACKGROUND ART

Presently, when air bag covers are provided in automobiles on the drivers side of the vehicle, the air bag is stored in the steering column behind an air bag cover. During automatic inflation of the air bag, the air bag cover moves away from the steering column to permit its safety function between the steering column and the operator of the vehicle.

Recent practice in the automotive industry is utilization of all plastic fabricated air bag covers. Conventional air bag covers used in conjunction with occupant restraint systems often include various connection systems for attaching the air bag cover to the uninflated air bag container. As those skilled in the art will recognize, such systems normally include a two piece cover construction wherein a first cover portion, usually manufactured from a relatively stiff material, is initially disposed directly over the uninflated air bag container. A second more resilient cover portion is next affixed over the first cover portion and used as the outer decorative cover.

Clark et al. U.S. Pat. No. 4,325,568 discloses a modular occupant restraint system including an inflator, a cushion, a container for the cushion and an air bag cover for the container assembled as a module. Clark et al. utilizes a two piece air bag cover construction.

Gaultier U.S. Pat. No. 5,085,462 discloses an air bag and vehicle horn switch assembly. Gaultier also discloses a conventional two piece cover construction.

Adams et al. U.S. Pat. No. 5,186,490 discloses a cover for a inflatable restraint system for a motor vehicle which contains a slot in the upper wall thereof into which a replaceable thin or membrane type switch assembly in inserted. Adams et al. further discloses an air bag cover having an injection molded thermoplastic upper wall and a soft outer cover exposed to the interior of the vehicle manufactured from urethane, vinyl or polyester. The outer cover completely encompasses and overlaps the upper wall structure and uninflated air bag forming two structures the air bag must exit to carry out its function.

The Embach, U.S. Pat. No. 4,934,735, discloses a device which has inner and outer covers or plates, each of which has split lines which separate the upper walls into upwardly and oppositely opening upper and lower pairs of flaps to permit deployment of the inflatable cushion. A switch assembly is located between either or both pair of flaps and includes one or more membrane switches located between the flaps and respective key pads projecting outwardly of the cover flap for closing respective pairs of circuits on the upper and lower flexible membranes of the membrane switch to each other.

The Heidorn, U.S. Pat. No. 5,308,106, discloses an air bag module cover assembly with a switch subassembly removably attached at a front surface of the assembly.

The Winget, U.S. Pat. No. 5,062,661, discloses a rigid plate attached to the substantially rigid remainder of a front panel of an air bag cover to define a hollow compartment which together move upon manual actuation of a flexible, manually operable diaphragm at the front surface of the front panel. Upon separation from the side panel, the front panel, including the diaphragm, the hollow compartment and a rigid plate move together to permit the inflating air bag to leave the cover. The front panel has a first electrically conductive inner surface for making a circuit path with a corresponding second electrically conductive inner surface of the rigid plate.

The Cooke, II, U.S. Pat. No. 5,344,185, discloses an air bag cover having a replaceable horn switch and a removable cover band.

Some of the above switches are relatively small and oftentimes inaccessible for drivers who have large hands or for drivers who have limited manual dexterity. Also, such switches extend, at least to a limited extent, above the exterior surface of the air bag cover and may strike the occupant upon air bag inflation. Consequently, there is a need for a horn switch device which is incorporated in an air bag cover, is relatively easy to service and which is actuable over a relatively large surface area of the air bag cover and which does not extend above the generally planar exterior surface of the air bag cover.

DISCLOSURE OF THE INVENTION

An object of the present invention is to provide an air bag cover that is affixable directly to an air bag container and which has at least one switch assembly incorporated therein.

Another object of the present invention is to provide an air bag cover having at least one switch assembly incorporated therein which is actuable over a relatively large surface area of the air bag cover, which is relatively easy to service and which does not extend above the exterior surface of the air bag cover.

In carrying out the above objects and other objects of the present invention, a plastic molded, snap-on air bag cover mountable onto an air bag assembly including a retaining member is provided. The cover includes a front cover having inner and outer surfaces adapted to overlie an uninflated air bag and being separable along a first prescribed tear pattern upon deployment of the air bag. The cover also includes a switch assembly which has a flexural material lying behind the inner surface of the front cover and at least one rear panel secured to the inner surface of the front cover in containing relation to the switch assembly to form a hollow compartment for the switch assembly. The cover finally includes first and second side panels connected to opposite sides of said front cover and a resilient clip member extending from each of said side panels, each clip member having an extending snap-on groove defined therein adapted to cooperate with said retaining member for affixing said air bag cover to the air bag container. The switch assembly is removably secured within the hollow compartment and wherein one of the first and second panels includes a slot formed completely therethrough to remove the switch assembly from the cover to facilitate repair and replacement of the switch assembly.

Preferably, each clip member is characterized in cross section as having an engagement section for contacting the retaining member during mounting onto the container and a biasing groove formed therein to facilitate resilient displacement of the engagement section to assist in a snap-on mounting of the cover onto the container.

An air bag cover constructed in accordance with the above invention provides numerous advantages. For example, the switch assembly is easily actuable over a relatively large surface area on the outer surface cover. Furthermore, such a switch assembly can be relatively inexpensively incorporated in a conventional air bag cover without the need to modify the air bag cover to allow a part of the switch assembly to extend above the outer surface of the cover, thereby freeing up additional areas on the steering column. Also, the switch assembly can be easily serviced.

These and other features and additional objects of the invention will occur to those skilled in the art on reading the following description with reference to the accompanying drawings.

BRIEF DESCRIPTION OF THE DRAWINGS

FIG. 6 is an enlarged, fragmentary view of a clip connector of the present invention;

FIG. 7 is an enlarged, fragmentary view of the clip connector of the present invention looking along the directions of lines 7—7 in FIG. 6; and FIG. 8 is a cross sectional view of the clip connector of the present invention taken along lines 8—8 of FIG. 6.

BEST MODE FOR CARRYING OUT THE INVENTION

Figure 1:
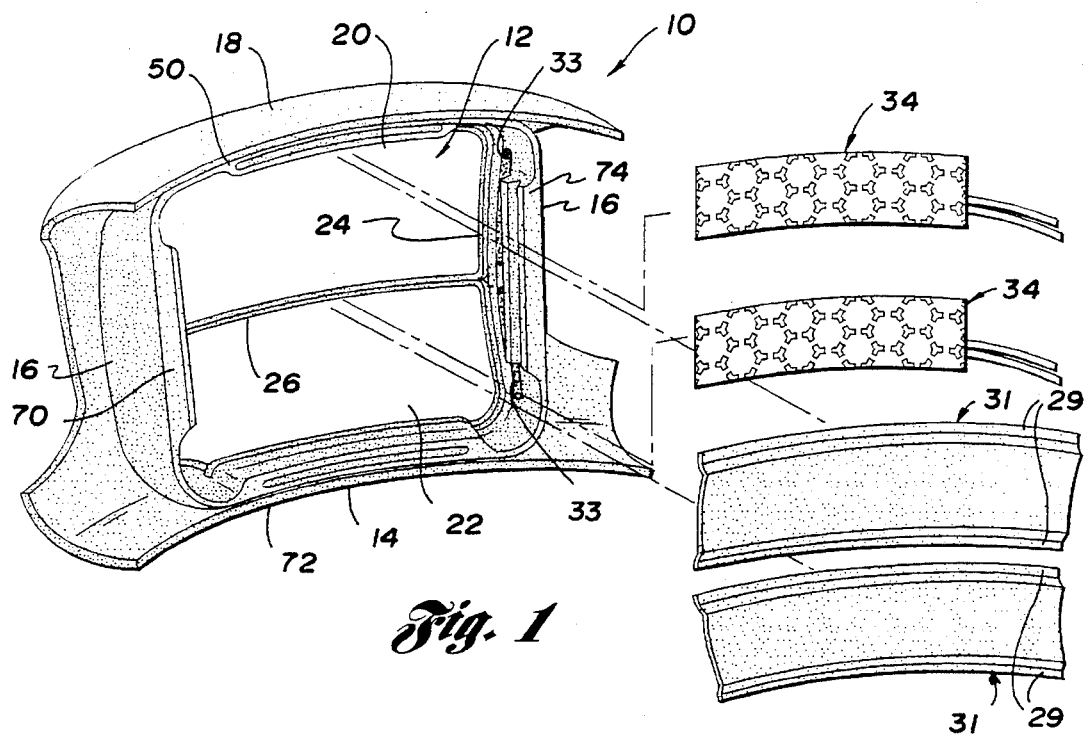
FIG. 1 is an exploded view of an automotive air bag cover, constructed in accordance with the present invention.
Figure 2:
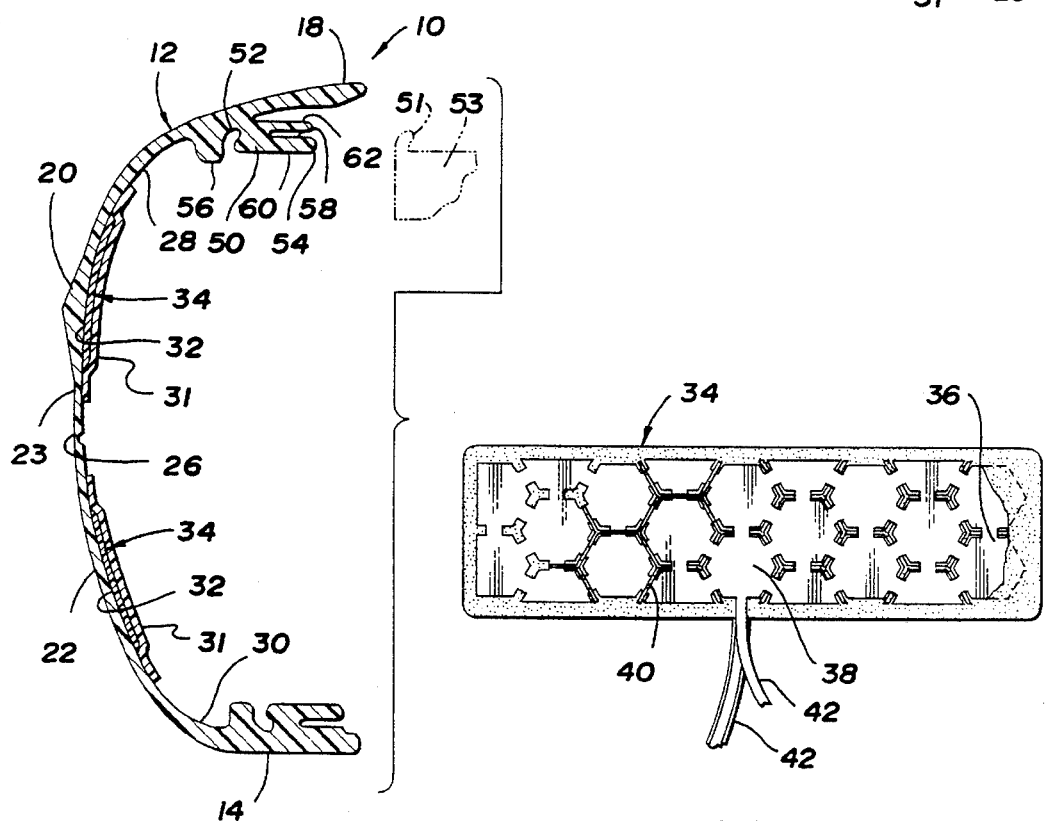
FIG. 2 is a sectional view of the assembled air bag cover of FIG. 1.

Referring now to the drawing Figures, there is illustrated in FIGS. 1 and 2, a first embodiment of an automotive air bag cover, generally indicated at 10, constructed in accordance with the present invention. Typically, the automotive air bag cover 10 is secured at the top end of a vehicle drive column (not shown) at the steering wheel of the vehicle.

A front cover, generally indicated at 12 of the air bag cover 10, is integrally formed with side panels 14, 16 and 18. Typically, the side panels 14, 16 and 18 are apertured, as illustrated in FIGS. 1 and 2, to permit the cover 10 to be fixedly secured to the vehicle drive column. Outer surface 23 is disposed to face the vehicle operator (not shown).

The front and side panels 12, 14, 16, and 18 are adapted to enclose an uninflated automotive air bag (not shown) between the cover 10 and the steering column (not shown).

The front panel 12 includes upper and lower portions 20 and 22, respectively. The upper and lower portions 20 and 22 are interconnected to the side panels 16 at break seams 24 (only one of which is shown in FIG. 1) and to each other at a break seam 26. The break seams 24 and 26 are of reduced thickness, to permit the air bag, as it is inflating, to exert a force at the inner portion of the front panel 12 to cause the upper and lower portions 20 and 22 of the front panel 12 to separate from the side panels 16 along the break seams 24 and to separate from each other along the break seam 26.

The upper portion 20 of the front panel 12 is hingedly connected to the top panel 18 at a hinge 28 and the lower portion 22 of the front panel 12 is hingedly connected to the bottom side panel 14 at a hinge 30, as best shown in FIG. 2. After separation from the side panels 16, the upper and lower portions 20 and 22 of the front panel 12 can swing upwardly and downwardly, respectively, and out of the way of the inflating air bag.

Rear panels 31 are fixedly secured at upper and lower flanges 29 to the upper and lower portions 20 and 22 of the front panel 12 at their inner surfaces to move therewith and to form hollow compartments 32, as best shown in FIG. 2. Preferably, the rear panels 31 are hot plate welded, heat staked or otherwise attached to the upper and lower portions 20 and 22 at their outer periphery adjacent the break seam 26 between the upper and lower portions 20 and 22, respectively, and adjacent the break seams 24.

The air bag cover 10 may include a pair of horn switch assemblies, generally indicated at 34. Each assembly 34 extends substantially the entire width of the front panel 12 between the side panels 16 within its respective hollow compartment 32. Each switch assembly 34 can be slidably removed from its respective compartment and out slits 33 formed in one or both of the side panels 16. In this way, each switch assembly 34 is easily removable from its hollow compartment 32 so that the switch assembly 34 can be easily serviced without removing the cover 10 from its attached container. The rear panels 31 do not cover any of the break seams 24 or 26 since this would hinder or possibly prevent separation along the break seams 24 and 26.

Figure 3:
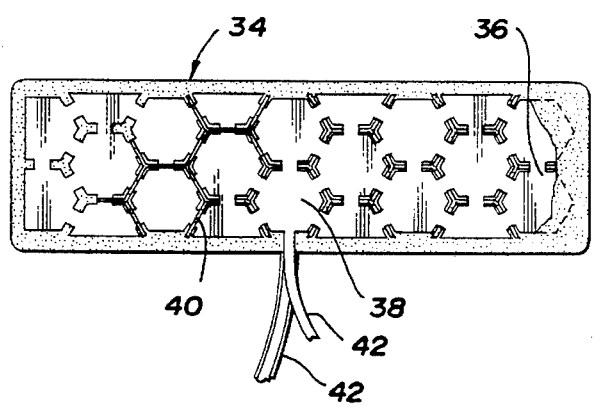
FIG. 3 is a top plan view, partially broken away, of a horn switch assembly.

As illustrated in FIG. 2, each switch assembly 34 substantially fills its respective hollow compartment 32. As illustrated in FIG. 3, each horn switch assembly 34 includes a pair of spaced flexible, transparent, plastic layers 36. On the inner surface of one of the plastic layers 36, there is formed a matrix layer 38 of interconnected hexagonal pads which forms an electrically conductive inner surface for making a circuit path with a corresponding second electrically conductive inner surface of another matrix of interconnected hexagonal pads formed on the other plastic layer 36. Upon manual actuation of the corresponding portion of the front panel 12, the circuit path is made.

The circuit path is made through an insulator layer 40 which is disposed between and spaces the layers 38 apart so that electrical connection is only made between the hexagonal pads of the layers 38. The insulator layer 40 insulates the interconnecting portions of the electrically conductive inner surfaces of the layers 38 from one another. The insulator layer 40 is preferably made of foam and has a honeycomb structure.

Preferably, the horn switch assemblies 34 are foil switch assemblies cut to size from a mat of material commercially available from Illinois Tool Works, Inc. of Glenview, Ill. Then, electrically conductive leads 42 which are encapsulated in plastic are electrically connected to certain pads of each of the layers 38 at one end thereof and to the automobile's electrical system at the opposite end through a break-away connection.

Referring now to FIG. 2, there is shown a resilient clip connector 50 extending from side panel 18. A snap-on groove 52 is shown disposed within clip connector 50. Clip connector 50 is comprised of a front engagement section 54 and a rear shoulder section 56 with snap-on groove 52 disposed between front engagement section 54 and rear shoulder section 56. Snap-on groove 52 is configured to cooperate with a retaining rim 51 on uninflated air bag container 53 (shown in phantom). For proper connection and retainment, the snap-on groove should have a cross-sectional shape that corresponds to the shape of the air bag container rim.

As shown, clip connector 50 also includes a biasing groove 58 which extends in a direction parallel with the snap-on groove 52. The biasing groove 58 divides the front engagement section 54 into a first segment 60 and a second segment 62. The biasing groove 58 allows the first segment 60 to deform and move toward the second segment when the air bag container rim 51 is initially engaged with the clip connector just prior to full engagement within the snap-on groove 52.

Referring now to FIG. 1 there is shown four clip connectors 50, 70, 72, and 74 extending from each side panel. It is contemplated in the preferred embodiment that each clip member extend at least one third of the length of the respective side panel and the snap-on groove 52 extend the entire length of the clip connector 50.

Figure 4:
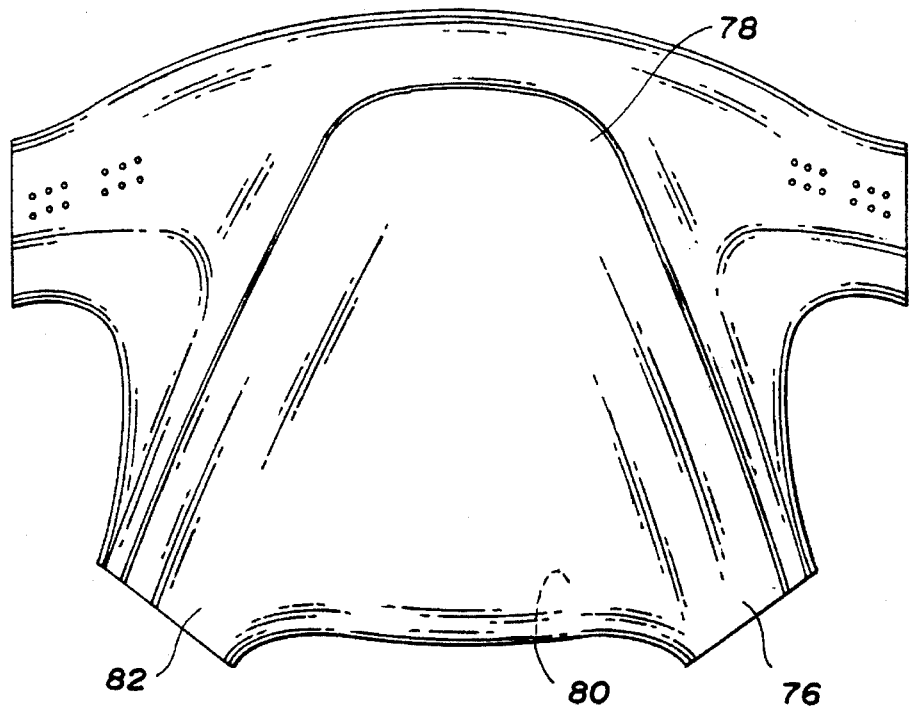
FIG. 4 is a front plan view of an alternative embodiment of an automotive air bag cover constructed in accordance of the present invention.
Figure 5:
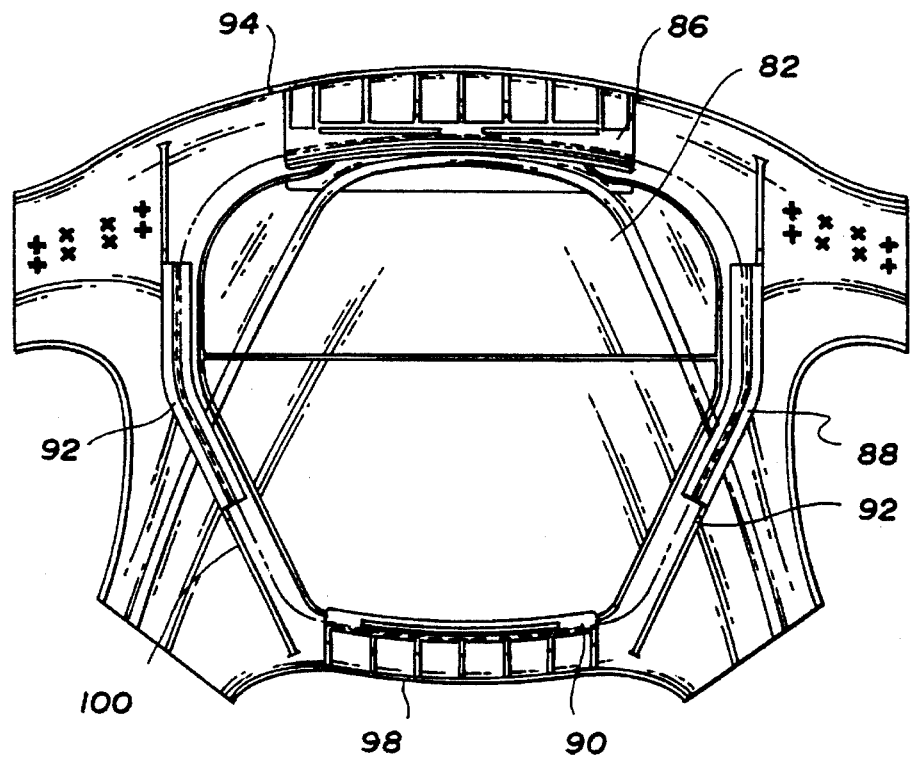
FIG. 5 is a rear plan view of the alternative embodiment of FIG. 4.

Referring now to FIGS. 4 and 5, there is shown generally, air bag cover 76, an alternative embodiment constructed in accordance with the present invention. The air bag cover 76 includes a front cover 78 having an inner surface 82 and an outer surface 80. The inner and outer surfaces 82 and 80 respectively define a thickness of front cover 78 which is in a range from 2.0 to 6.0 millimeters. The air bag cover 76 is designed to be operably located within the automobile interior (not shown) such that the front cover outer surface 80 is exposed to occupant view.

The air bag cover 76 includes four clip connectors 86, 88, 90 and 92 connected to respective side panels 94, 96, 98, and 100. Referring now to FIG. 8, and using clip connector 86 as representative of the other clip connectors, each clip connector includes a front engagement section 102 and a rear shoulder section 104. As with the prior embodiment, a snap-on groove 106 is defined between the front engagement section 102 and the rear shoulder section 104. The snap-on groove 106 of the second embodiment of the present invention has a cross sectional shape which corresponds to the rim 108 of the air bag container 110. The snap-on groove shown in FIG. 8 is L-shaped to correspond to the outer shape of rim 108. Clip connector 86 further includes an outer inclined surface 112 as shown in FIGS. 7 and 8.

Referring now to FIG. 6, there is shown a biasing groove 114. Biasing groove 114, as with the prior embodiment discussed above, extends parallel to the snap-on groove 106. The biasing groove divides clip connector 86 into a first segment 116 and a second segment 118. As those skilled in the art will recognize, the inclined surface 112 in cooperation with the biasing groove 114 assist in locating and abuttingly engaging the rim 108 of the air bag container 110 within the snap-on groove 106.

More specifically, as the rim 108 of the air bag container 110 initially contacts the clip connector 86, the rim slides along the inclined surface 112 towards the snap-on groove 106. Simultaneously, the first segment 116 of the front engagement section is deformed and moves toward second segment 118. In this fashion, the snap-on connection of the air bag cover to the air bag container is assisted. For structural integrity and material cost savings it is contemplated that the front engagement portion may include a plurality of spaced apart, parallel supports 120 which are disposed perpendicular to the snap-on groove.

It is preferred that the air bag cover of the present invention be manufactured from a flexible thermoplastic rubber such as commercially available "Santoprene" 201-87 provided by Advance Elastomers Systems of Auburn Hills, Mich. Santoprene is a registered trademark of the Monsanto Company. Santoprene 201-87 is a colorable thermoplastic general purpose elastomer with good fluid resistance which is processable by injection molding and extrusion.

The tear strength, ultimate tensile strength, hardness, and elasticity of the material are characteristics important to the choice of the thermoplastic material used to manufacture the air bag. The preferred thermoplastic material used for manufacture of the air bag cover has a tensile strength in a range from 15.0 to 17.0 Mpa's. The preferred material used has a tear strength in a range from 47 to 51 KN/m at 25 degrees celsius and 21 to 25 KN/m at 100 degrees celsius. The preferred material used has a durometer hardness in a range of 70 to 100 on the Shore A scale. The above characteristics in conjunction with the structure of the air bag cover satisfy the necessary conditions related to the inflation and exit of the air bag from the cover.

Having described the structural characteristics of the present invention, attention is now turned to operation of the snap-on air bag cover. Referring to FIGS. 5–8, each clip connector 86, 88, 90 and 92 extends from a respective side panel 94, 96, 98 and 100. Each clip connector is attached to the respective side panel in a live hinge-like fashion such that the clip connectors and associated side panels move away from the front cover upon operative insertion of the air bag container rim 108 within snap-on groove 106.

For example, opposing side panels 96 and 100 move away from front cover 78 and also away from each other as the rim 108 is abuttingly engaged against the inclined surfaces 112 of each clip connector 88 and 92. Further the cooperation of the biasing grooves in the other pair of opposing clip connectors 86 and 90 works to assist in locating and operatively connecting the air bag container 110 to the air bag cover 76.

The particular thermoplastic rubber described above assists in providing the operative resilient characteristics needed to provide an air bag cover which is directly affixable to an air bag container. The air bag cover of the present invention is resilient enough to accept deformation of the side panels and clip connectors while the air bag cover is connected to the air bag container and rigid enough to contain the air bag container on the steering column (not shown) throughout the operative life of the associated vehicle. Thus, the tear strength, ultimate tensile strength, hardness, and elasticity of the thermoplastic rubber material, as described above are important to the overall operation of the air bag cover.

The air bag cover of the present invention is preferably injection molded using conventional injection molding techniques. The preferred embodiment of the present invention will include clip connectors that extend at least one third the length of the respective side panel. It is contemplated that the clip connectors do not extend completely along the length of the side panels because this makes the air bag cover difficult to remove from the mold in the manufacturing process.

While only certain embodiments of the method and apparatus of the present invention have been shown and described, others may be possible without departing from the scope of the following claims.

What is claimed is:

1. A plastic molded, snap-on air bag cover mountable onto an air bag assembly including and open at a side position about the periphery of the rear panel a retaining member, the cover comprising:

a front cover having inner and outer surfaces adapted to overlie an uninflated air bag and being separable along a first prescribed tear pattern upon deployment of the air bag;

a switch assembly which includes a flexural material lying behind the inner surface of the front cover;

a rear panel secured to the inner surface of the front cover in containing relation to the switch assembly to form a hollow compartment for the switch assembly;

first and second side panels connected to opposite sides of said front cover;

a resilient clip member extending from each of said side panels, each clip member having an extending snap-on groove defined therein adapted to cooperate with said retaining member for affixing said air bag cover to said air bag container wherein the switch assembly is removably secured within the hollow compartment and wherein one of the first and second side panels includes a slot formed completely therethrough to remove the switch assembly from the cover to facilitate repair and replacement of the switch assembly.

2. The air bag cover as in claim 1 wherein each clip member is characterized in cross section as having an engagement section for contacting the retaining member during mounting onto said air bag container and a biasing groove formed therein to facilitate resilient displacement of the engagement section to assist in a snap-on mounting of the cover onto said air bag container.

3. The air bag cover as in claim 2 wherein said engagement section of said each clip member comprises a front engagement section and a rear shoulder section, said front engagement section having an inclined outer surface for cooperating with said retaining member for sliding said air bag cover onto said air bag container, and the respective snap-on groove is disposed between said front and rear sections.

4. The air bag cover as in claim 3 wherein each said front engagement section includes a plurality of spaced, parallel supports disposed perpendicular to the respective snap-on groove.

5. The air bag cover as in claim 2 wherein each said snap-on groove is "L" shaped in cross section.

6. The air bag cover as in claim 2 wherein each said clip member extends along at least one third the length of the respective side panel and each said snap-on groove extends the entire length of each said clip member.

7. The air bag cover as in claim 2 wherein said side panels are hingedly connected to said front cover for allowing said side panels to move in relation to said front cover.

8. The air bag cover as in claim 2 molded from a resilient thermoplastic material.

9. The air bag cover as in claim 8 wherein said thermoplastic material is a thermoplastic rubber.

10. The air bag cover as in claim 8 wherein said material has a tensile strength in a range from 15.0 to 17.0 Mpa and a tear strength in a range from 47 to 51 kN/m at 25 degrees celsius and 21 to 25 kN/m at 100 degrees celsius.

11. The air bag cover as in claim 8 wherein said material has a durometer hardness ranging from 70 to 100 on the Shore A scale.

12. An improved air bag cover of the type comprising:

a front panel overlying an undeployed air bag, the front panel, being plastic molded, having inner and outer surfaces and being separable along a prescribed tear pattern upon deployment of the air bag;

a switch assembly which includes a flexural material lying behind the inner surface of the front panel; and a rear panel secured to the inner surface of the front panel in containing relation to the switch assembly and forming a hollow compartment for the switch assembly; the improvement comprising:

the switch assembly is a foil switch assembly including a pair of spaced flexible layers each having an electrically conductive inner surface and wherein the rear panel includes peripheral flanges which are secured to the inner surface of the front panel to form the hollow compartment for removing the foil switch assembly and to fix the foil switch assembly in operative position to respond to an actuating signal applied to the outer surface of the front panel wherein the flanges are secured to the inner surface of the front panel at upper and lower positions about the periphery of the rear panel and open at a side position about the periphery of the rear panel to facilitate repair and replacement of the foil switch assembly.

13. A method of manufacturing an air bag cover comprising the steps of:

molding a plastic article which includes a front panel for overlying an undeployed air bag, the front panel being formed with inner and outer surfaces and a prescribed tear pattern;

inserting a foil switch assembly including a pair of spaced flexible layers each having an electrically conductive inner surface behind the inner surface of the front panel; and securing a rear panel to the inner surface of the front panel in containing relation to the foil switch assembly at positions about peripheral flanges to provide a hollow compartment wherein the flanges are secured to the inner surface of the front panel at upper and lower positions about the periphery of the rear panel and open at a side position about the periphery of the rear panel to facilitate repair and replacement of the foil switch assembly.

14. An improved air bag cover of the type comprising:

a front panel overlying an undeployed air bag, the front panel, being plastic molded, having inner and outer surfaces and being separable along a prescribed tear pattern upon deployment of the air bag;

a switch assembly which includes a flexural material lying behind the inner surface of the front panel; and a rear panel secured to the inner surface of the front panel in containing relation to the switch assembly and forming a hollow compartment for the switch assembly, the improvement comprising:

the switch assembly is a foil switch assembly including a pair of spaced flexible layers, each having an electrically conductive inner surface and wherein the rear panel includes peripheral flanges which are secured to the inner surface of the front panel to form the hollow compartment and to fix the foil switch assembly in operative position to respond to an actuating signal applied to the outer surface of the front panel, wherein the flanges are secured to the inner surface of the front panel by thermal coupling at upper and lower positions about the periphery of the rear panel and open at a side position about the periphery of the rear panel to form a slot therethrough to facilitate repair and replacement of the foil switch assembly.

15. A method of manufacturing an air bag cover comprising the steps of:

molding a plastic article which includes a front panel for overlying an undeployed air bag, the front panel being formed with inner and outer surfaces and a prescribed tear pattern;

providing a foil switch assembly including a pair of spaced flexible layers each having an electrically conductive inner surface behind the inner surface of the front panel; and providing a rear panel adapted to be secured to the inner surface of the front panel in containing relation to the switch assembly at positions about peripheral flanges to provide a hollow compartment, wherein the rear panel is secured to the inner surface of the front panel by thermal coupling at upper and lower positions about the periphery of the rear panel and open at a side position about the periphery of the rear panel to form a slot therethrough to facilitate repair and replacement of the foil switch assembly.

* * * * *

UNITED STATES PATENT AND TRADEMARK OFFICE
CERTIFICATE OF CORRECTION

PATENT NO. : 5,590,902

DATED : January 7, 1997

INVENTOR(S) : Thomas L. Eckhout

It is certified that error appears in the above-indentified patent and that said Letters Patent is hereby corrected as shown below:

Column 7, lines 3-4, after "including" and before "a", delete "and open at a side position about the periphery of the rear panel" and insert therefor --an airbag container having--.

Signed and Sealed this

Fifth Day of August, 1997

Attest:

BRUCE LEHMAN

Attesting Officer

Commissioner of Patents and Trademarks